United States Patent [19]  [11] 4,331,303
Moss  [45] May 25, 1982

[54] TWO PART FRONT COVER FOR SPIN CAST REELS

[75] Inventor: Elvis W. Moss, Tulsa, Okla.

[73] Assignee: Brunswick Corporation, Skokie, Ill.

[21] Appl. No.: 218,921

[22] Filed: Dec. 22, 1980

[51] Int. Cl.³ .............................................. A01K 89/01
[52] U.S. Cl. ................................................ 242/84.2 A
[58] Field of Search ...................... 242/84.2 R, 84.2 A, 242/84.2 F, 84.21 A, 84.5 A, 84.51 A

[56] References Cited
U.S. PATENT DOCUMENTS 3,255,980  6/1966  Ueno ............................ 242/84.2 A
3,469,799  9/1969  Hull ............................. 242/84.2 A Primary Examiner—Billy S. Taylor
Attorney, Agent, or Firm—John G. Heimovics

[57] ABSTRACT

A fishing reel is disclosed which is of the spin cast type having a suitable internal mechanism including a spinner head assembly, a spool assembly, a reel body, and an anti-reverse assembly. The reel has an improved housing including a front cover and a rear cover with a stem and mounting foot thereon for mounting to a fishing rod. The front cover has two parts, the first part being cylindrical with a front and rear edge and the second part having a conical forward portion and a cylindrical rearward portion. The front edge portion of the first part has two cylindrical flanges forming an annular groove therebetween. The inner of the flanges has spaced apart cutouts therein. The rearward end of the second part is receivable within the annular groove of the first part and further has tabs around its interior which project into the cutouts when so received, thereby preventing the first and second parts from being pulled apart.

3 Claims, 9 Drawing Figures

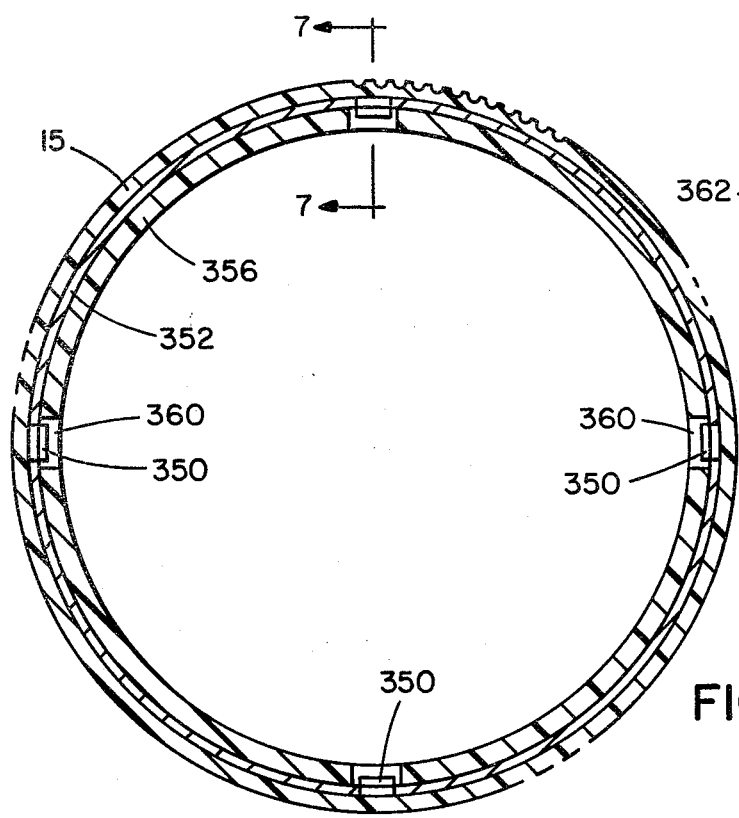
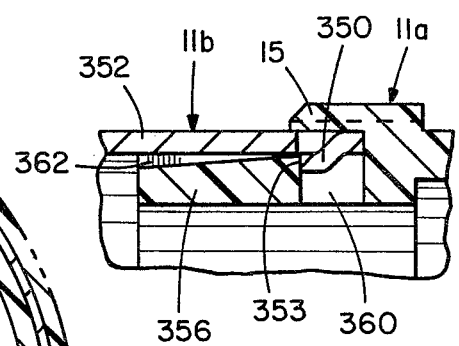
FIG.6
FIG.7
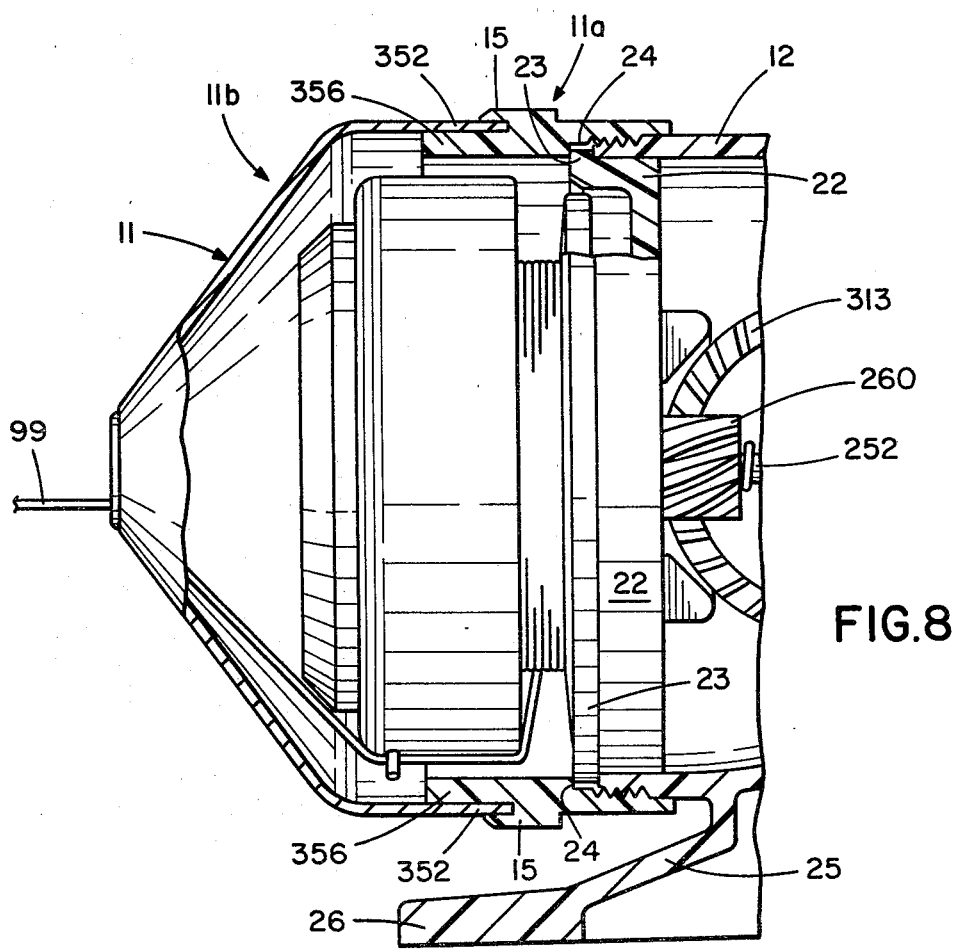
FIG.8

TWO PART FRONT COVER FOR SPIN CAST REELS

DESCRIPTION

1. Technical Field

This invention relates to a housing for a fishing reel and more particularly to a two part front cover for the housing.

2. Background Art

Fishing reels in the prior art have included generally front and rear covers which are connected together to house the internal mechanism of the reel. However, both the front and rear covers have generally each been single components made of a single material, usually metal or plastic. There are distinct advantages to each material, metal being light weight and strong and plastic being cheaper to mold into complex shapes and components. Heretofore, compromises were reached wherein the advantageous features of a selected material were used, but the disadvantages of that material had to be tolerated.

DISCLOSURE OF THE INVENTION

A fishing reel is disclosed which is of the spin cast type having a suitable internal mechanism including a spinner head assembly, a spool assembly, a reel body, and an anti-reverse assembly. The reel has an improved housing including a front cover and a rear cover with a stem and mounting foot thereon for mounting to a fishing rod. The front cover has two parts, the first part being cylindrical with a front and rear edge and the second part having a conical forward portion and a cylindrical rearward portion. The front edge of the first part has two cylindrical flanges forming an annular groove therebetween. The inner of the two flanges has spaced apart cutouts therein. The rearward portion of the second part is receivable within the annular groove of the first part and further has tabs around its interior which project into the cutouts when so received. Once the tabs spring into the cutouts, abutment of the tabs on the cutout walls prevent the first and second parts from being pulled apart.

The disclosed two part front cover may be easily manufactured and assembled taking advantage of the characteristics of the selected materials for the respective parts. The first part may be made of a suitable plastic material while the second part may be made of a suitable metal such as aluminum. The mating tabs and cutouts of the two parts permit the two parts to be snapped together during assembly and, when snapped together, they are virtually impossible to pull apart. Since the rearward end of the second part is within an annular groove, it is prevented from spreading when the two parts are pressured apart, thereby preventing the tabs from slipping out of the cutouts and, of course, thereby preventing the two parts from being separated.

BRIEF DESCRIPTION OF THE DRAWINGS

FIG. 1A is a rear perspective view of the gear and ratchet of the crankshaft;

FIG. 6 is a cross-sectional view of the combined front cover taken along line 6—6 of FIG. 2;

FIG. 7 is a partial cross-sectional view taken along line 7—7 showing the detent locking; and FIG. 8 is a partial cross-sectional view of the assembled fishing reel showing in particular the mating of the front cover parts and the rear cover.

BEST MODE FOR CARRYING OUT THE INVENTION

Figure 1:
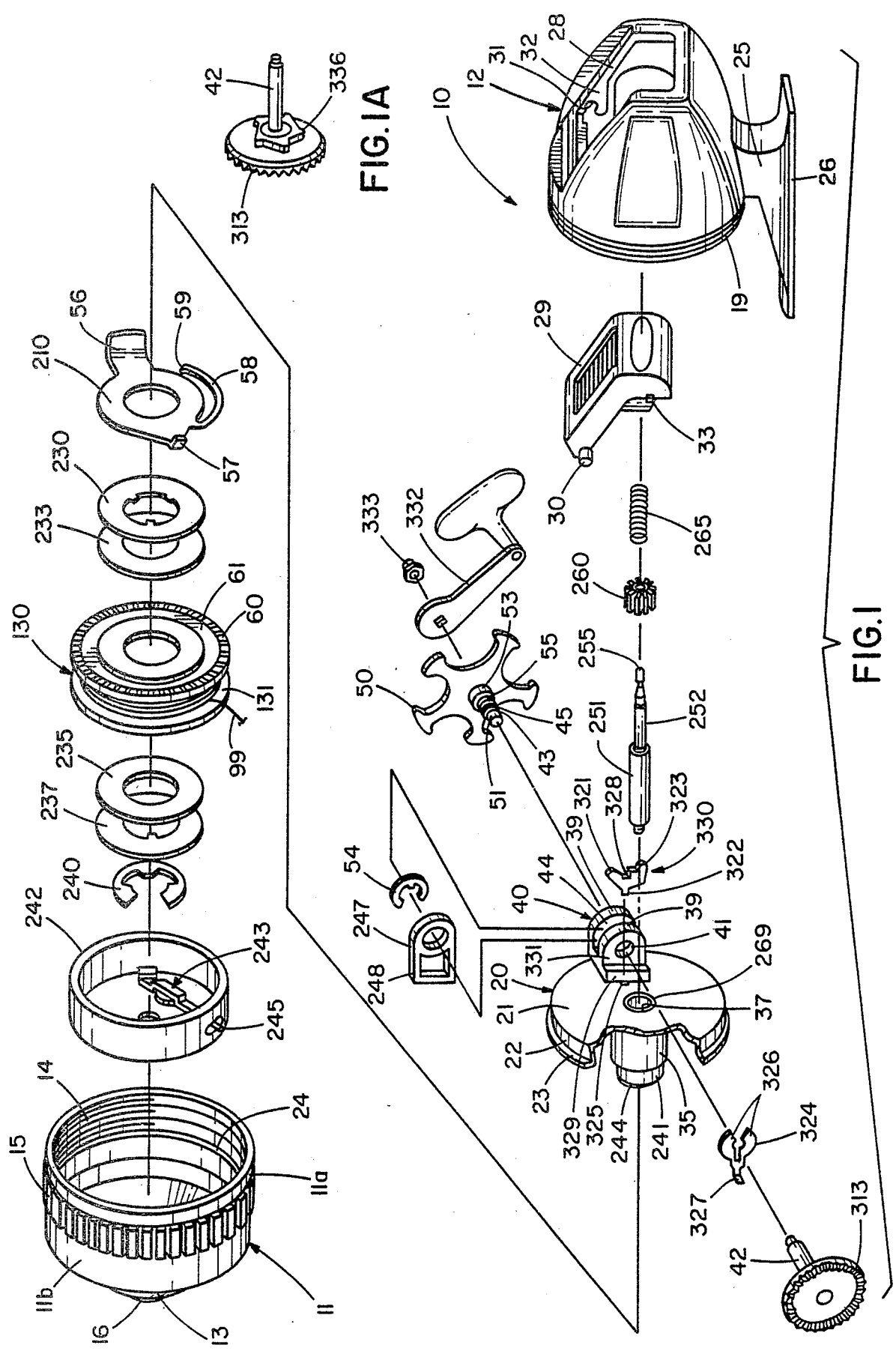
FIG. 1 is an exploded view of a reel embodying the invention.
Figure 2:
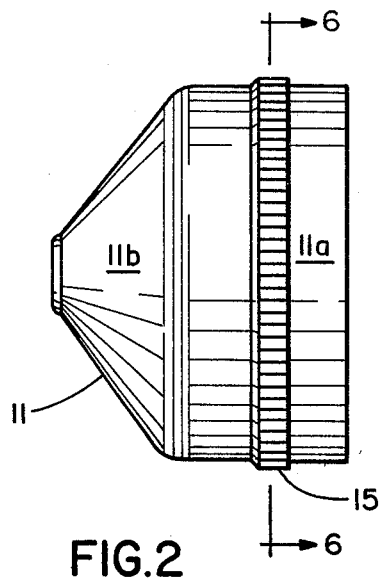
FIG. 2 is a plan view of the front cover.
Figure 4:
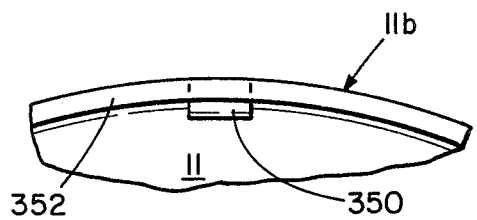
FIG. 4 is a partial view of the cone-shaped second part taken along line 4—4.
Figure 5:
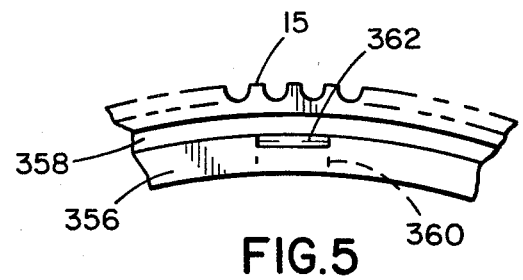
FIG. 5 is a partial view of the cylindrically-shaped first part taken along line 5—5.

Referring first to FIG. 1, there is shown a reel, including a closed face housing 10, having a two-part front cup-shaped cover 11 and a rear cup-shaped cover 12. The front cover 11 has a ring or cylindrically-shaped first part 11a and a cone-shaped second part 11b. The ring or cylindrically-shaped first part 11a of the front cover 11 is molded from a high impact strength plastic, such as ABS. The cone-shaped second part 11b of the front cover 11 is formed of metal, such as aluminum. The rear cover 12 can be formed of a platable grade ABS with a chrome or nickel plating. The cone-shaped second part 11b has a generally annular rearward edge portion engaging in a forwardly facing locking groove 17 formed on the second part 11b of the cover 11. The cone-shaped second part 11b has means for rigidly locking the second part 11b to the first part 11a. The cone-shaped second part 11b of the cover 11 has a conical front portion 13 including a circular line opening which mounts an annular line guide 16 in a known manner. The cylindrical first part 11a of the front cover 11 has helical threads 14 formed on the rearmost internal surface thereof and has knurled gripping portions 15 formed on the external surface thereof.

A reel body 20 is provided and includes a circular mounting plate or deck plate 21 which has a forwardly extending cylindrical sleeve portion 22 integrally formed around the outer periphery thereof. The reel body 20 may be made of plastic material, such as ABS or a glass filled polycarbonate. The forward edge of the sleeve 22 has a flange 23 extending radially outwardly beyond the outer surface of the sleeve portion 22. The cylindrical first part 11a of the front cover 11 is undercut rearward of the internal thread 14 to provide a rearwardly facing shoulder 24 axially spaced from the end of the internal thread 14. The reel body 20 with the radially extending flange 23 is inserted in the rear opening of the front cover 11 with the flange 23 bearing against the shoulder 24 in the undercut portion. The rear cover 12, which has on its forwardly facing end portion an external thread 19, is threaded into the internal thread 14 of the front cover 11 until the forwardly facing edge of the rear cover 12 engages the radially outwardly extending flange 23 to trap the reel body 20 between the front cover 11 and the rear cover 12. The rear cover 12 has an integrally molded, radially extending stem 25 with a mounting foot 26 on the outer end thereof for attachment to the appropriate part of a fishing rod. The mounting foot 26 is to be attached to the upper surface of a fishing rod for use.

The rear cover 12 has a rearwardly facing opening 28 that is substantially rectangular in shape extending through a sloped upper portion and vertical rear portion thereof. A one-piece thumb button 29 has a shape substantially mating with the shape of the opening 28 in the rear cover 12 and has a pair of sidewardly extending pivots 30 on the upper forward side edges thereof which snap into slotted pivot opening 31 formed in the adjacent side walls 32 of the opening 28. A pair of sidewardly extending tabs 33 are formed on the lower side edges of the thumb button 29 such that with the thumb button 29 assembled from the inside of the rear cover 12, the sidewardly extending pivots 30 will snap into the slotted openings 31 in the walls 32 of the rear cover 12 with the sidewardly extending tabs 33 abutting a vertical inner surface of the rear cover 12 adjacent the opening 28. The tabs 33 prevent the thumb button 29 from pivoting rearwardly out of the opening 28 in the rear cover 12.

A central hub 35 is carried by and projects forward of the deck plate 21 concentric with the sleeve 22 with a drag plate 210, back spool washer 230, back flat drag washer 233, spool assembly 130, front flat drag washer 235, front spool washer 237, all retained on the hub 35 by means of spool retainer clip 240 which fits into a groove (not shown in FIG. 1) aligned with a shoulder separating the hub 35 from a reduced diameter front portion 241 of hub 35.

A center shaft 251 is mounted in a sleeve bearing 269 seated in a center hole 37 extending through the deck plate 21 and hub 35, with a spinner head assembly 242 threaded onto the forward threaded end of the shaft 251. The spinner head assembly 242 partially surrounds the forward flange of the spool assembly 130 with a supply of fishing line 99 being wound on a spool 131 of the spool assembly 130. The line 99 is wound or unwound from the spool 131 over the spinner head assembly 242 and through the line guide 16 in the front cover 11.

The center shaft 251 is slidably and rotatably mounted in the sleeve bearing 269 in the deck plate 21. A pinion gear 260 is splined on a reduced diameter spined portion 252 of the center shaft 251 and is resiliently maintained in a forward position against the deck plate 21 by a center shaft spring 265. The spring 265 bears against an abutting end 255 on the center shaft 251 to urge the pinion gear 260 against the deck plate 21 and to urge the center shaft 251 in a rearward direction relative to the deck plate 21. The splined connection between the pinion gear 260 and center shaft 251 permits the axial sliding motion of the shaft 251 relative to the pinion gear 260 while at the same time rotation of the pinion gear 260 will rotate the center shaft 251.

Depressing the thumb button 29 moves the center shaft 251 and spinner head assembly 242 forward relative to the hub 35. As the spinner head assembly 242 moves forward, a pickup pin mechanism 243, mounted on spinner head assembly 242, will move forward of and will disengage from the front portion 241 of the hub 35 and from a cam 244 on the axial face of the front portion 241 of the hub 35 thereby retracting a pickup pin 245 from its extended position radially outward of the spinner head assembly 242. With the thumb button 29 fully depressed, a line brake member (not shown in FIG. 1) on the forward face of the spinner head assembly 242 will be urged against the inside of the cone-shaped part 11b of the front cover 11 to trap the line 99 therebetween to prevent casting of the line from the reel. Releasing the pressure on the thumb button 29 will maintain the spinner head assembly 242 in a forward casting position, but the spring 265 will retract the center shaft 251 and the spinner head assembly 242 enough to unclamp the line 99 whereby the spinner head assembly 242 will not interfere with the fishing line 99 which can then be cast freely from the reel.

The deck plate 21 also includes a rearwardly projecting boss 40 having spaced apart legs 39 with aligned transverse openings 41 therethrough for receiving, in a concentric manner, a crankshaft 42 surrounded, in part, by a cylindrical post 43. The boss 40 has a slot 44 between the legs 39, which slot 44 extends transverse to the axis of the opening 41. The slot 44 aligns with a slot (not shown in FIG. 1) in the deck plate 21 with a slide drag actuator 247 positioned in the slots and being threadably engaged with a threaded portion 45 of the post 43. The drag actuator 247 extends through the aligned slots and forward of the deck plate 21 and is moved by rotation of the post 43 in a direction along the axis of the post 43 between the spaced apart legs 39 of the boss 40. The degree of drag braking pressure applied to the spool 131 through the drag actuator 247 is selectively and precisely controllable through a star wheel 50 mounted on the post 43 where the post 43 projects outward of the boss 40. The post 43 has spaced bearing surfaces 51 and 53 which seat in the openings 41. A retainer clip 54 engages in a slot 55 at the junction between the bearing surface 53 and the threads 45 on the post 43, which slot 55 aligns with one wall of the slot 44 so that the star wheel 50 and post 43 can be rotated relative to the boss 40 without the post 43 moving axially relative to the boss 40.

The projecting contact head 248 of the drag actuator 247 engages with an arcuately curved extended ramp cam 56 on the drag plate 210. The drag plate 210 has an anchoring tab 57 located diametrically opposite the cam 56, which tab 57 engages in a recess (not shown in FIG. 1) in the front surface of the deck plate 21. A cantilever arm 58 has a peripheral connection with the drag plate 210 and extends along an arc parallel to a peripheral portion of the drag plate 210. The cantilever arm 58 has an axially facing tip 59 engaging with serrations 60 on the axially facing surface of one flange 61 of the spool 131. The drag plate 210 bears against the back spool washer 230, back flat drag washer 233, spool assembly 130, front flat drag washer 235, front spool washer 237, all of which are backed against the fixed retainer clip 240. The contact head 248 of the drag actuator 247 engages with the cam 56 and, as it is moved radially outward of the drag actuator 247, the pressure or drag on the spool 131 will be increased and, as the drag actuator 247 is moved radially inward on the cam 56, the pressure or drag on the spool 131 will be decreased. The drag actuator 247 is advanced or moved radially inward (decreased drag) by rotating the star wheel 50 in one direction and is retracted or moved radially outward (increased drag) by rotating the star wheel 50 in the opposite direction.

The crankshaft 42, with a gear 313 attached at one end, in inserted through the post 43 in the boss 40 and has a handle 332 attached by means of a nut 333 to the other end of said crankshaft 42. The gear 313 meshes with the pinion gear 260 on the center shaft 251 so that rotation of the crank handle 332 will rotate the center shaft 251 and spinner head assembly 242.

An anti-reverse assembly 330, which is associated with the crankshaft 42, includes a ratchet 336, shown in FIG. 1A, fixed on the back of the gear 313 for rotation with the gear 313 and crankshaft 42. The anti-reverse assembly 330 further includes a pivotable pawl 321 having a pivot tab 322, a pawl tooth 323, and a pawl actuator 324. The pawl pivot tab 322 extends into a slot 325 formed in deck plate 21, the slot 325 having one wall in alignment with the one wall 329 which is offset radially inward toward the center shaft 251 from the end face 331 of the boss 40. The pawl actuator 324 has a pair of bifurcated legs 326 which grip the surface of the crankshaft 42 with sufficient force that the pawl actuator 324 will rotate with the crankshaft 42, but will slide relative to the crankshaft 42 when the gripping force is exceeded. An actuator tab 327 extends transverse to the plane of the pawl actuator 324 and engages in a recess 328 in the midportion of the pawl 321. The pawl 321 with the pivot tab 322 in the slot 325 will have one face of the pawl 321 against the wall 329 of the boss 40 and will have the pawl tooth 323 aligned with the ratchet 336. The crankshaft 42, when telescoped in the post 43 and boss 40, will locate the pawl actuator 324 between the ratchet 336, fixed on the back face of gear 313, and the end face 331 of the boss 40 in the vicinity of the opening 41 in the boss 40, so that the pawl actuator 324 is offset slightly from the pawl 321 with the transverse actuator tab 327 engaged in the recess 328 of the pawl 321. Rotation of the crank handle 332 in a counterclockwise direction, as viewed in FIG. 1, will pivot the crankshaft 42 and the pawl actuator 324 in a counterclockwise direction which will pivot the pawl 321 in a clockwise direction around pawl pivot tab 322 to move the pawl tooth 323 out of alignment with the teeth of the ratchet 336. The crank handle 332 will, therefore, be permitted to be rotated in that direction without interference. The gripping resistance between the pawl actuator 324 and the crankshaft 42 will be overcome as soon as the pawl 321 pivots to its extreme position, whereupon the crankshaft 42 continues to rotate relative to the pawl actuator 324. Rotation of the handle 332 in the clockwise direction moves the pawl actuator 324 in the clockwise direction with the tab 327 pivoting the pawl 321 in a counterclockwise direction to move the pawl tooth 323 into the path of the ratchet teeth to stop further rotation of the crankshaft 42 and handle 332 in that direction.

The structure for attaching the cylindrically-shaped first part 11a and the cone-shaped second part 11b of the front cover 11 is shown in FIGS. 2-8. The cone-shaped second part 11b has a conical forward portion 355 and a cylindrical rearward portion 359, tabs 350, four are shown in the drawings, are struck inwardly at spaced apart locations around the rear edge portion 352 of the cone-shaped second part 11b. The tabs 350 are cut into the cylindrical portion 359 by pressing inwardly on the edge portion 352 to provide a forwardly facing surface 353 facing into the open interior of the second part 11b. The tabs 350 are on the inner surface of the second part 11b leaving indentations 354 on the outer surface thereof. The structure of each tab 350 is relatively simple to form in the material of the second part 11b and, due to the structure and material, each tab 350 is readily distorted when assembling the two parts 11a and 11b of the front cover together as will appear in more detail below.

The cylindrically-shaped first part 11a has a cylindrical front portion 356 having an outer diameter substantially equal to the inner diameter at the rear edge portion 352 of the cone-shaped second part 11b, thereby permitting the two parts 11a, 11b to mate together. The gripping portions 15 form an annular flange around the cylindrical front portion 356 of the first part 11a, the gripping portion 15 and the cylindrical front portion 356 together defining an annular groove 358 therebetween.

Figure 3:
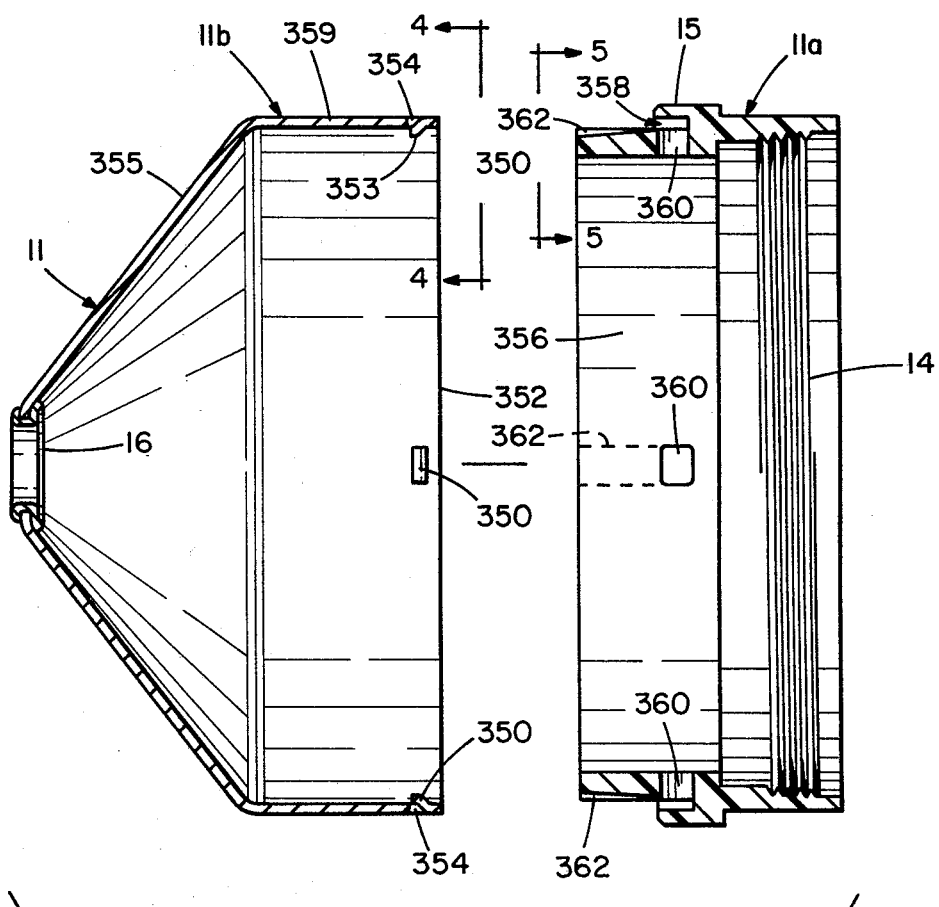
FIG. 3 is a cross-sectional exploded view of the two parts of the front cover.

Formed in the cylindrical front portion 356 at spaced apart locations are cutouts 360 which are aligned with the tabs 350 of the second part 11b. As best shown in FIG. 3, a ramped portion 362 is provided with each of the cutouts 360. The ramped portions 362 facilitate the mating of the first and second parts 11a, 11b by both indicating the location of the cutouts 360 (which are somewhat hidden beneath the gripping portions 15) and by easing the movement of the tabs 350 over the cylindrical front portion 356 of the first part 11a.

A secure mating of the first and second parts 11a, 11b is provided when the two parts are pushed together as shown in FIGS. 6-8. As the second part 11b is pushed over the first part 11a, the tabs 350 are distorted and gradually pushed outward by the ramp portions 362. Once the two parts 11a, 11b are pushed together fully, the rear edge portion 352 of the second part 11b fits snugly in the annular groove 358 and the tabs 350 spring back inwardly into the cutouts 360. In this position, as shown in FIG. 7, the forwardly facing surfaces 353 of the tabs 350 abut the forward side of the cutouts 360 so that it will be virtually impossible to pull the two parts 11a, 11b apart. In addition, the gripping portion 15 encircles the rear edge portion 352 of the second part 11b, including the tabs 350, preventing the rear edge portion 352 from spreading and thereby maintaining the tabs 350 in the cutouts 360.

As previously described, the front cover 11 has its internal thread 14 threaded onto the external thread 19 of the rear cover 12. The two covers 11, 12 are tightened until the flange 23 on the reel body sleeve portion 22 is secured between the shoulder 24 on the front cover 11 and the forwardly facing edge of the rear cover 12 as shown in FIG. 8. The design aids in fixing the internal mechanism of the reel with respect to the housing 10. The first part 11a of the front cover 11 may be threaded onto the rear cover 12 either before or after the second part 11b is attached.

Other aspects, objects and advantages of this invention will become apparent from an examination of the specification, drawings, and appended claims.

I claim:

1. In a spin casting type fishing reel having an internal mechanism including a spool assembly, a reel body, a spinner head assembly, and an anti-reverse assembly, the improved housing comprising:
   a rear cover having a stem and mounting foot thereon for mounting to a fishing rod;
   a first part of a front cover, the first part being cylindrical with a front and rear edge, the front edge including two cylindrical flanges forming an annular groove therebetween, one of the flanges having circumferentially spaced apart cutouts therein;
   means for securing the rear edge of the first part to the rear cover;
   a second part of the front cover, the second part including a conical forward end and a cylindrical rearward end, the rearward end being receivable within the annular groove of the first part and having spaced apart tabs receivable within the cutouts when the rearward cylindrical portion is in the annular groove, thereby preventing the first and second parts from being pulled apart.

2. The improvement of claim 1, wherein the cutouts are in the inner of the flanges and further comprising ramp portions leading to the cutouts whereby the tabs are gradually urged outward when the second part is pressed over the first part until the tabs align with the cutouts, at which point the tabs spring inward into the cutouts.

3. The improvement of claim 1, further comprising a rearwardly facing shoulder within the first part and an annular flange around the reel body whereby the annular flange is held between the forward edge of the rear cover and the rearwardly facing shoulder of the first part of the front cover when the front cover and the rear cover are mounted together.

* * * * *